| United States Patent [19] | [11] Patent Number: 4,786,722 |
|---|---|
| Zehner | [45] Date of Patent: Nov. 22, 1988 |

[54] D-TAGATOSE AS A LOW-CALORIE CARBOHYDRATE SWEETENER AND BULKING AGENT

[75] Inventor: Lee R. Zehner, Brookeville, Md.

[73] Assignee: Biospherics Incorporated, Rockville, Md.

[21] Appl. No.: 901,611

[22] Filed: Aug. 29, 1986

[51] Int. Cl.$^4$ ................................................. A23L 1/09
[52] U.S. Cl. ..................................... 536/1.1; 536/125; 426/658
[58] Field of Search ................... 536/1.1, 125; 426/658

[56] References Cited

U.S. PATENT DOCUMENTS

| 4,069,104 | 1/1978 | Barker et al. | 536/125 |
|---|---|---|---|
| 4,262,032 | 4/1981 | Levin | 426/658 |
| 4,503,080 | 3/1985 | Brabbs et al. | 426/560 |
| 4,680,184 | 7/1987 | Seiden et al. | 426/654 |

OTHER PUBLICATIONS

H. R. Moskowitz, American Journal of Psychology, vol. 84, No. 3, pp. 387–405 (1971).
Lenzer et al; Chemical Abstracts 72:10126w (1968).

Primary Examiner—Ronald W. Griffin
Assistant Examiner—Nancy S. Carson
Attorney, Agent, or Firm—Roylance, Abrams, Berdo & Goodman

[57] ABSTRACT

There is disclosed a process for the preparation of a sweetened edible formulation in which the sweetening agent is less calorific than sucrose which comprises the step of mixing a foodstuff with an amount sufficient to sweeten the foodstuff of D-tagatose.

4 Claims, No Drawings

D-TAGATOSE AS A LOW-CALORIE CARBOHYDRATE SWEETENER AND BULKING AGENT

BACKGROUND OF THE INVENTION

This invention relates to the use of D-tagatose as a low-calorie carbohydrate sweetener and bulking agent in the preparation of sweetened edible formulations.

J. D. Dziezak in *Food Technology*, Vol. 112 (January, 1986) states that: "The ideal sweetener, as described by the Calorie Control Council (1985) should have the same or greater sweetness as sucrose in addition to being colorless, odorless, readily soluble, stable, functional and economically feasible. The ideal sweetener should contribute reduced or no calories to the diet, be normally metabolized or resistant to digestion and be non-toxic and non-promoting of dental caries. To date, the ideal sweetener is not commercially available".

Commercially available intense sweeteners typically have problems with thermal and/or aqueous instability, reproduction of the true sweetness of sucrose, the requirement of a bulking agent to simulate the functional properties of sugars, and imputed health problems.

U.S. Pat. No. 4,262,032 to Levin proposes the use of L-hexose sugars as the solution to this problem. The taste quality and relative sweetness of L-hexoses are identical to the respective D-hexoses. Bulking agents are not required. All functional properties of L-hexoses are identical to those of the respective D-hexoses. Physical properties in general are identical, with the exception of the direction of the rotation of polarized light. Chemical properties of the D- and L-enantiomers are identical in non-chiral environments, while in the presence of many enzymes chemical properties are quite different. It is this difference in enzymically mediated chemical reactivities coupled with the identical sweetness of the D- and L-hexoses that makes the L-hexose concept viable.

D-Tagatose is a naturally-occurring keto-hexose. Although this material is not commonly found in nature, it has been reported to occur in the gum of the *Sterculia setigera* date and in the lichens *Rocella linearis* and *Rocella fucoformis*. One research group has identified D-tagatose in strongly heated (120° C., 8–10 hours) cow's milk. H. R. Moskowitz in American Journal of Psychology, Vol. 84, No. 3, pages 387–405 (1971), reports a sweetness level for D-tagatose of 0.5 times that for a 1% by weight sucrose solution.

SUMMARY OF THE INVENTION

It has now been found that D-tagatose, like many of the L-hexoses, is not readily absorbed across the intestinal membrane, thus rendering it less calorific than sucrose when used to prepare a sweetened edible formulation. Moreover, it is at least as sweet as sucrose with the same quality of taste. It is a white, crystalline solid with similar functional and browning properties of D-fructose, the major component of high-fructose corn syrup. The D-tagatose that remains in the gastrointestinal tract of orally dosed animals is slowly degraded by indigenous microflora and does not appear to cause a laxation effect at high doses. Due to the fact D-tagatose is either not metabolized by the body or is metabolized to such a small extent, it will have little or no effect upon the normal body functions. Consequently, this new sweetening agent may ideally be used in foodstuffs and other edible formulations designed for people whose metabolizable carbohydrate intake must be restricted because of conditions such as diabetes mellitus or obesity.

DETAILED DESCRIPTION OF THE INVENTION

A group of carbohydrate and alternative sweeteners was recently evaluated by a test panel comprising four persons. The panel was given two drops of a 10% by weight aqueous solution of a sweetener unknown to the taster and asked to compare sweetness to a 10% by weight aqueous sucrose solution. All solutions were prepared in deionized, distilled water and were allowed to stand for at least 24 hours prior to administration. Of all the sweeteners tested, D-tagatose was reported to be the sweetest. All participants rated its sweetness at least at the same level as sucrose. The average value was about 1.2 times the sweetness of 10% by weight aqueous sucrose solution. No apparent aftertaste or negative observations on quality of sweetness were noted.

To indicate the metabolic fate of D-tagatose in mammals, a non-starved mouse was fed orally 2000 mg of D-tagatose per kg of body weight, and the urine and feces were monitored for 48 hours. Prior to feeding, no D-tagatose was found by thin layer chromatography (TLC) in the mouse's urine or feces. After dosing, TLC monitoring of the feces showed a very high recovery of D-tagatose, while none was detected in the urine. The mouse was observed to have soft stool between 3 and 10.5 hours after dosing, but no diarrhea was observed. The feces were normal between 0 and 3 hours and between 11 and 48 hours. These results indicate that D-tagatose is not absorbed across the intestinal membrane and that it is not degraded significantly in the small intestine or in the lower intestine by indigenous microflora. Since neither the D-tagatose nor any caloric, microbial-degradation products is absorbed by the host, D-tagatose cannot be caloric to the host.

The literature does give insight to the metabolic pathway for D-tagatose in mammals. R. Rognstad in FEBS Lett., 52(2), 292 (1975), reported that liver cells from hamsters metabolized D-tagatose to D-glucose. The metabolism proceeds through formation of triose phosphates to D-fructose-6-phosphate and D-glucose-6-phosphate. The D-glucose-6-phosphate is the starting point for the normal metabolism of natural sugars via the glycolysis and Krebs cycles. R. Rognstad in Arch. Biochem. Biophys., B 218(2), 488 (1982), reported that hepatocytes of fasted rats formed D-glucose from D-tagatose at about one-half the rate from D-fructose, although both were metabolized by identical pathways. The significance of these results to the expected safety of D-tagatose as a low calorie sweetener is important since apparently no unnatural metabolites are produced during the metabolism of D-tagatose in these studies.

Two research groups have studied degradation of D-tagatose by human microflora. In one study, A. Lenzer et al in Tartu Riikliku Ulikooli Toim., 1968, No. 215, 250; CA: 72, 10126W, found fermentation by *Lactobacillus casei*, but none by *L. platarum*, *L. fermenti*, and *L. brevis*. In the other study by R. Schweisfurth et al. Zentralbl. Bakteriol. Parasitenk., Infektionskr. Hyg., Abt. 1: Orig., 1969, 211(3), 380, of 24 bacteria and yeast strains, only one, *Salmonella typhimurium* could assimilate D-tagatose. These results indicate that some degradation of D-tagatose in the human colon can be expected. This fermentation could be beneficial if it is slow in the human gut and produces non-caloric metabolites like $CO_2$ and methane. Such fermentations also show that D-tagatose is biodegradable and therefore will not pose a problem to wastewater treatment plants.

D-Tagatose is soluble in water and stable in aqueous solutions. Therefore, it is useful for sweetening all types of materials which are intended for consumption or at least contact with the mouth of the user, such materials being herein generically designated as edible materials or foodstuffs. Typical illustrative examples of edible foodstuffs which may be sweetened according to this invention are fruits, vegetables, juices or other liquid preparations made from fruits or vegetables, meat products, particularly those conventionally treated with sweetened liquors, such as bacon and ham, milk products such as chocolate dairy drinks, egg products, such as egg nogs, custards, angel food mixes, salad dressings, pickles and relishes, ice creams, sherbets and ices, ice milk products, bakery products, icings, confections, and confection toppings, syrups and flavors, cake and pastry mixes, beverages, such as carbonated soft drinks, fruit ades, wines, dietary type foods, cough syrups and other medicinal preparations such as pastes, powders, foams and denture-retaining adhesives, mouthwashes and similar oral antiseptic liquids, tobacco products, adhesives for gumming stamps, envelopes, labels and the like.

In using the sweetening agent of this invention, it is incorporated in the material to be sweetened in the amount required to attain the desired level of sweetness. It is obvious that there is nothing critical about the concentration of sweetening agent which is used. It is simply a matter of attaining a desired sweetness level appropriate to the material in question. Moreover, the technique of sweetening materials with D-tagatose offers no difficulty as it is simply incorporated with the material to be sweetened. The sweeteners may be added directly to the material or they may be first incorporated with a diluent to increase its bulk and add to the material. As diluent, if needed, one may use liquid or solid carriers, such as water, starch, sorbitol, salt, citric acid, or other non-toxic substances compatible with the material to be sweetened.

While the invention has been described as mainly concerned with foodstuffs and other non-toxic formulations for human consumption, it is obviously within the scope of this invention that these sweetened compositions may be used for consumption by other animals, such as farm and domestic animals.

While the invention has been described with respect to the use of D-tagatose as the sole sweetening agent, it is understood that it may be used in combination with conventionally used sweetening agents, e.g., in combination with a minor amount of sucrose.

Furthermore, D-tagatose may be used as a bulking and sweetening agent in combination with one of the intensive sweeteners such as aspartame or saccharin.

What is claimed is:

1. A process for the preparation of a sweetened edible formulation in which the sweetening agent is less calorific than sucrose which comprises the step of mixing a foodstuff with an amount sufficient to sweeten such foodstuff of D-tagatose.

2. A process as defined in claim 1 wherein said D-tagatose is used in combination with an intense sweetener as a bulking agent as well as a sweetening agent for the foodstuff.

3. A sweetened edible formulation in which the sweetening agent is less calorific than sucrose which comprises a mixture of a foodstuff with an amount sufficient to sweeten such foodstuff of D-tagatose.

4. A sweetened edible formulation in which the sweetening agent is less calorific than sucrose comprising a mixture of a foodstuff with an amount sufficient to sweeten such foodstuff of D-tagatose and an intense sweetener.

* * * * *